US006970813B1

(12) United States Patent
Houlding et al.

(10) Patent No.: US 6,970,813 B1
(45) Date of Patent: Nov. 29, 2005

(54) INSIGHT ARCHITECTURE VISUALIZATION TOOL

(75) Inventors: David Ian Houlding, Tampa, FL (US); Dave Marchand, Tampa, FL (US)

(73) Assignee: Perot Systems Corporation, Plano, TX (US)

( * ) Notice: Subject to any disclaimer, the term of this patent is extended or adjusted under 35 U.S.C. 154(b) by 724 days.

(21) Appl. No.: 09/702,241

(22) Filed: Oct. 30, 2000

(51) Int. Cl.$^7$ .............................. G06G 7/62; G06F 3/00
(52) U.S. Cl. ......................... 703/13; 703/22; 715/735; 715/736; 715/744
(58) Field of Search .............................. 345/736, 744, 345/735; 703/13, 22; 709/201, 217–219, 709/227, 230; 707/1, 10, 102; 715/735, 736, 715/744

(56) References Cited

U.S. PATENT DOCUMENTS

| | | | | |
|---|---|---|---|---|
| 5,913,052 A | * | 6/1999 | Beatty et al. | 703/15 |
| 6,144,962 A | * | 11/2000 | Weinberg et al. | 707/10 |
| 6,275,225 B1 | * | 8/2001 | Rangarajan et al. | 345/700 |
| 6,289,299 B1 | * | 9/2001 | Daniel et al. | 703/21 |
| 6,336,138 B1 | * | 1/2002 | Caswell et al. | 709/223 |
| 6,429,860 B1 | * | 8/2002 | Hughes | 345/418 |
| 6,434,598 B1 | * | 8/2002 | Gish | 709/203 |
| 6,496,202 B1 | * | 12/2002 | Prinzing | 345/762 |
| 6,550,054 B1 | * | 4/2003 | Stefaniak | 717/104 |
| 6,643,668 B2 | * | 11/2003 | Sluiman | 707/200 |
| 6,678,882 B1 | * | 1/2004 | Hurley et al. | 717/121 |
| 6,697,087 B1 | * | 2/2004 | Kelly | 345/735 |
| 6,697,825 B1 | * | 2/2004 | Underwood et al. | 715/530 |
| 6,704,030 B1 | * | 3/2004 | McDonald et al. | 345/736 |
| 6,714,217 B2 | * | 3/2004 | Huang et al. | 345/736 |
| 6,772,413 B2 | * | 8/2004 | Kuznetsov | 717/136 |

* cited by examiner

Primary Examiner—John Follansbee
Assistant Examiner—Aaron C. Perez-Daple
(74) Attorney, Agent, or Firm—Jenkens & Gilchrist, P.C.

(57) ABSTRACT

A system and method that facilitates the modeling of an architecture through XML configuration is presented. Using this system and method, system developers that are developing a modeled architecture may, before system implementation begins, visualize and understand the system architecture and behavior. Similarly, during the development and deployment phases, developers may monitor different graphical views and/or the controller implementation in order to determine the look and/or feel of the application. Accordingly, different view and/or controller implementations may be plugged into the present invention to give a different look and/or feel. The application may also be adapted to any system that uses any middleware or protocol to communicate.

12 Claims, 18 Drawing Sheets

Application Architecture for Viewing a Deployed Implementation of an Architecture

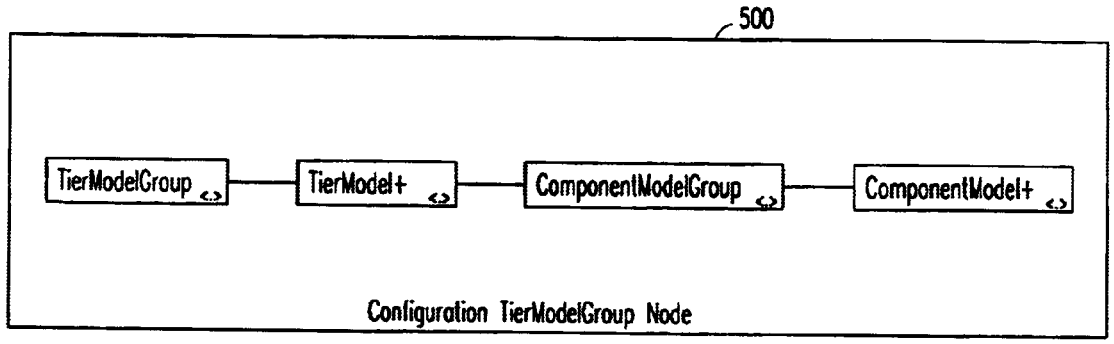

FIG. 5

| Attribute Name | Description | Data Type | Constraints | Required |
|---|---|---|---|---|
| name | Symbolic name of an element. This name is used by other configuration elements to refer to this element. | String | None | Yes |

Attributes for "TierModel" Element

FIG. 5A

| Attribute Name | Description | Data Type | Constraints | Required |
|---|---|---|---|---|
| name | Symbolic name of an element. This name is used by other configuration elements to refer to this element. | String | None | Yes |

Attributes for "ComponentModel" Element

FIG. 5B

| Attribute Name | Description | Data Type | Constraints | Required |
|---|---|---|---|---|
| name | Symbolic name of an element. This name is used by other configuration elements to refer to this element. | String | None | Yes |

Attributes for "PathModel" Element

| Attribute Name | Description | Data Type | Constraints | Required |
|---|---|---|---|---|
| name | Symbolic name used by other elements of the configuration to refer to this element. | String | None | Yes |

Attributes for "Event" Element

| Attribute Name | Description | Data Type | Constraints | Required |
|---|---|---|---|---|
| name | The name of the property. | String | None | Yes |

Attributes for "Property" Element

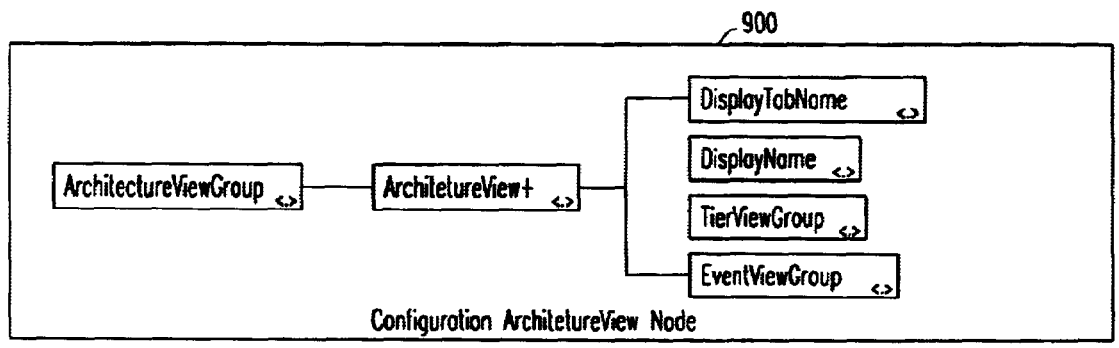

FIG. 9

| Attribute Name | Description | Data Type | Constraints | Required |
|---|---|---|---|---|
| name | Label used navigate the XML configuration. Useful when there are multiple architecture views in a configuration. | String | None | Yes |

Attributes for "ArchitectureView" Element

FIG. 9A

| Property Name | Property Value | Required | Description |
|---|---|---|---|
| Default Highlight Duration Millis | Duration in integer milliseconds. | No, default 5000. | The time in milliseconds that the last component in a nested path view will remain highlighted. |
| Default Highlight Duration Millis | Delay in integer milliseconds. | No, default 500. | Where an event is visualized with more than one path highlight this is the time between successive path highlights. |

Optional View Properties for Basic View Implementation

FIG. 9B

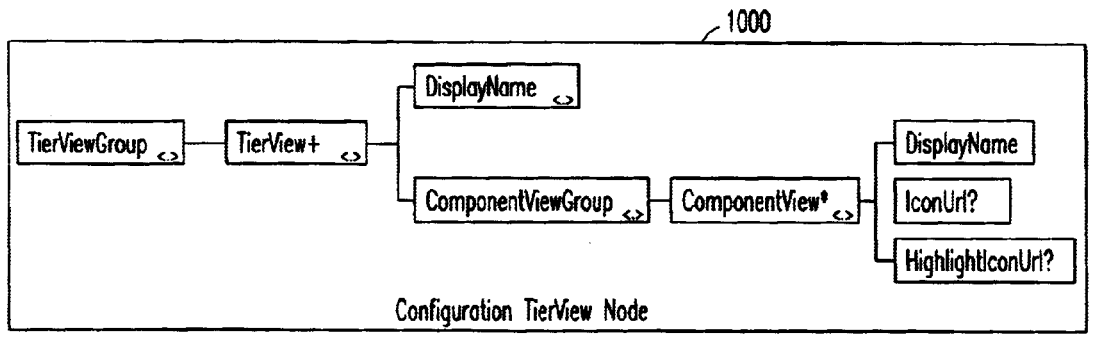

FIG. 10

| Attribute Name | Description | Data Type | Constraints | Required |
|---|---|---|---|---|
| Vertical Alignment | The vertical proximity of the label relative to the entity being labelled. | Enum | top\|middle\|bottom | No. Default "middle". |
| fontSize | The font size in points to use for the label. | Integer | >8. Values depend on font sizes contained in runtime environment. plain\|bold\|italic. | No. Default 12. No. Default "plain". |

Attributes for "DisplayName" Element

FIG. 10A

| Attribute Name | Description | Data Type | Constraints | Required |
|---|---|---|---|---|
| name | Symbolic name of the tier being viewed. | String | Corresponds to the name of a valid tier as specified by the value of the name attribute on a Model.ArchitectureMode. TierModel element. | Yes |

Attributes for "TierView" Element

FIG. 10B

| Attribute Name | Description | Data Type | Constraints | Required |
|---|---|---|---|---|
| name | Symbolic name of the component being viewed | String | Corresponds to the name of a valid component as specified by the value of the name attribute on a Model.ArchitectureMode.TierModel.ComponentMode element. Note that this component must exist in the same tier as referenced by the name attribute of the TierView parent of this element.<br><br>If this name does not correspond to a known component then the component will be rendered blank. This technique may be used to insert space between components in tiers. | Yes |

Attributes for "ComponentView" Element

*FIG. 10C*

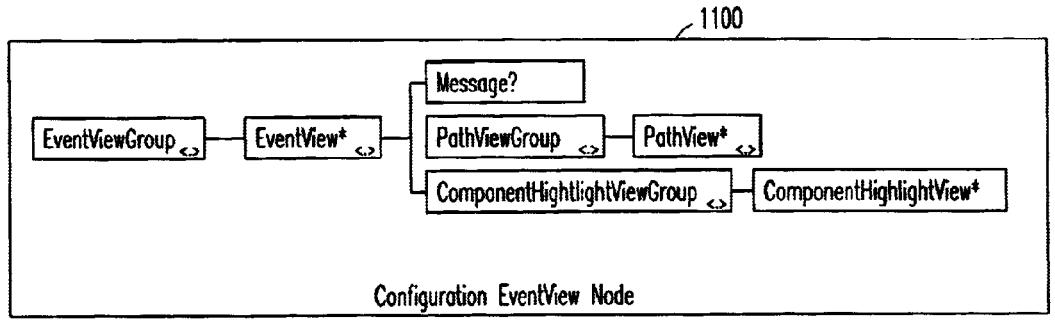

FIG. 11

| Attribute Name | Description | Data Type | Constraints | Required |
|---|---|---|---|---|
| name | Symbolic name of the event that triggers the visualization described by this Event View element. | String | Corresponds to a valid event name as defined by the value of the name attribute of a Model.ArchitectureModel.Event element. | Yes |

Attributes for "EventView" Element

FIG. 11A

| Attribute Name | Description | Data Type | Constraints | Required |
|---|---|---|---|---|
| name | Symbolic name of the path that being viewed. | String | Corresponds to a valid path name as defined by the value of the name attribute of a Model.ArchitectureModel.PathModel element. | Yes |
| startSide | The vertical side of the start component on which the path highlight begins. | Enum | left \| right | No. Default "right". |
| startPort | The port on the vertical side of the component at which the path highlight begins. Note that the sides of each component are actively divided into 10 regularly spaced ports with port 0 on the top and port 9 on the bottom. | Enum | 0 \| 1 \| 2 \| 3 \| 4 \| 5 \| 6 \| 7 \| 8 \| 9 | No. Default "4". | cont'd cont'd

| | | | | |
|---|---|---|---|---|
| verticalTrack | Where start and end components of a path are at different heights the path highlight must make a vertical transition between tiers. This attribute defines the horizontal positioning of this transition with 0 on the left, 9 on the right and regularly space intervals in between.<br>Where multiple paths may be highlighted concurrently and overlap during their vertical transition this attribute may be used to move them apart to avoid overlap. See also the verticalProximity attribute on this element. | Enum | 0 I 1 I 2 I 3 I 4 I 5 I 6 I 7 I 8 I 9 | No. Default "4". |
| endSide | The vertical side of the end component on which the path highlight ends. | Enum | left I right | No. Default "left". |
| endPort | The port on the vertical side of the component at which the path highlight ends. Note that the sides of each component are effectively divided into 10 regularly spaced ports with port 0 on the top and port 9 on the bottom. | Enum | 0 I 1 I 2 I 3 I 4 I 5 I 6 I 7 I 8 I 9 | No. Default "4". |
| color | The color of the path when highlighted. | String | A valid color, for example in the format "0xFF9C00". | No. Default "0xFF0000" (red). |
| verticalProximity | When start and end components of a path are at different heights the path must make a vertical transition. This attribute defines if this transition will be next to the start component or end component. See also the verticalTrack attribute on this element. | Enum | startComponent I endComponent | No. Default "startComponent". |
| onCheckpointName | Symbolic name of the checkpoint in time at which this path highlight begins. Used for example to control component highlight views. | String | None. | No. |
| offCheckpointName | Symbolic name of the checkpoint in time at which this path highlight ends. Used for example to control component highlight views. | String | None. | No. |

Attributes for "PathView" Element

*FIG. 11B*

| Attribute Name | Description | Data Type | Constraints | Required |
|---|---|---|---|---|
| name | The name of the component to highlight. | String | This corresponds to the name of a valid components as defined by the value of the name attribute of a Model.ArchitectureModel.TierMode | Yes |
| onCheckpointName | The name of the checkpoint in time at which point to highlight the component. | String | This corresponds to the value of the onCheckPointName attribute of a PathView element in the same View.ArchitectureView.Event View scope as this ComponentHighlight View element. | Yes |
| offCheckpintName | The name of the checkpoint in time at which point to unhighlight the component. | String | This corresponds to the value of the offCheckpointName attribute of a PathView element in the same View.ArchitectureView.Event View scope as this ComponentHighlight View element. This checkpoint should occur after the "on" checkpoint. | Yes |
| tier | The name of the tier containing the component to highlight. | String | This corresponds to the name of a valid tier as defined by the value of the name attribute of the Model.ArchitectureModel.ArchitectureModel.TierMode 1 element that contains the component with the name defined by the name attribute on the same ComponentHighlight View element. | Yes |

Attributes for "ComponentHighlight View" Element

*FIG. 11C*

Application Architecture for Simulation Mode

Application Architecture for Viewing in Auto-Cycle Mode

Application Architecture for Viewing a Deployed Implementation of an Architecture

INSIGHT ARCHITECTURE VISUALIZATION TOOL

BACKGROUND OF THE INVENTION

1. Technical Field of the Invention

The present invention is related to architecture visualization and, more particularly, to architecture visualization during conceptual, development or deployment phases of a system.

2. Description of Related Art

Architecture plays a critical part in the success of any development. Distributed systems are no exception, where architecture plays a key role throughout the lifetime of the system, from concept, to prototype, to partial system during development increments, and even in the complete deployed system. Before implementation of a system begins, it enables a model to be developed, verified and stress tested with use cases scenarios, enabling the design of the system to be fine-tuned up front without incurring the cost of changing code. During system implementation, the architecture provides a reference from which subsystems and services may be developed with confidence that they will integrate and collaborate with the rest of the system when complete. Even during deployment, the architecture plays an important role in guiding system changes and enhancements during its lifetime. Implementations in the form of components and middlewares typically change in any system with a lifespan of longer than a few years, while the architecture of the system lives on.

However, it is often the case that users are not fluent in software architectures and concepts. Furthermore, this effect is compounded by the fact that there is still no one pervasive standard architectural language throughout the software industry. This dilemma effectively reduces the ability of the user to participate in system design, development and maintenance, and limits the extent to which they are able to leverage the benefits of a solid and thorough architecture. This dilemma has far-reaching primary consequences including the following: (1) less participation in early stages of design, leading to late changes and "scope creep"; (2) an incomplete understanding of system complexity causing inaccurate planning; and (3) limited ability to foresee the consequence of system changes leading to reduced flexibility, extensibility, reliability, scalability and increased system downtime.

Secondary effects of this dilemma in a best case scenario involve increased costs and delays, and in a worst case scenario involve project failure. This dilemma presents a challenge for system developers to give users more insight into architectures during all phases of a system, from prototype to deployment.

The crucial role that architecture plays in any complex development cannot be disputed. However, a lack of understanding of architectural concepts, compounded by the lack of a pervasive standard architectural language often limits the realization of the benefits of a solid architecture. As such, visualization is a powerful paradigm that may be used to convey architectural ideas and concepts effectively.

In view of the above, it should be understood that the visualization of architectures facilitates a better understanding of architectures and, consequently, an improved ability to leverage the associated investment and benefits.

Accordingly, it is therefore an object of the present invention to provide a communication tool to help a user of a distributed system to visualize and understand architecture and behavior required to realize business use cases before system implementation begins.

It is also an object of the present invention to provide a diagnostic tool to monitor and verify system behavior as it is being built.

It is a further object of the present invention to provide a management tool for use during deployment to monitor a system.

SUMMARY OF THE INVENTION

The present invention is directed to a system and method for visualizing architectures both statically and dynamically. One or more graphical views of the tiers and components of a multi-tier architecture are presented and, accordingly, the system events are monitored.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 5 illustrates a Configuration TierModelGroup Node which may contain one or more TierModel elements;

FIG. 10 illustrates a Configuration TierView Node which may contain one or more TierView elements;

FIG. 10A describes the valid attributes for the DisplayName element;

FIG. 10B describes the valid attributes for the TierView element;

FIG. 10C describes the valid attributes for the ComponentView element;

FIG. 11 illustrates a Configuration EventView Node which may contain zero or more EventView elements;

FIG. 11A describes the valid attributes for the EventView element;

FIG. 11B describes the valid attributes for the PathView element;

FIG. 11C describes the valid attributes for the ComponentHighlightView element;

FIG. 5A describes the valid attributes for the TierModel element;

FIG. 5B describes the valid attributes for the ComponentModel element;

FIG. 9 illustrates a Configuration ArchitectureView Node which may contain one or more ArchitectureView elements;

FIG. 9A describes the attributes that may be added to the ArchitectureView element;

FIG. 9B describes the optional view properties for Basic View implementation;

DETAILED DESCRIPTION OF PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Essentially, in accordance with the present invention, an Application Architecture has a standard Model-View-Controller (MVC) architecture, which is composed of a plurality of components. A detailed description of each component of this architecture and examples of their roles, responsibilities and collaborations are provided below. Note that the implementations of the components are configurable via the XML 20 configuration and read at startup time. Note also that all of the components inside the box are running in the same process.

Figure 1:
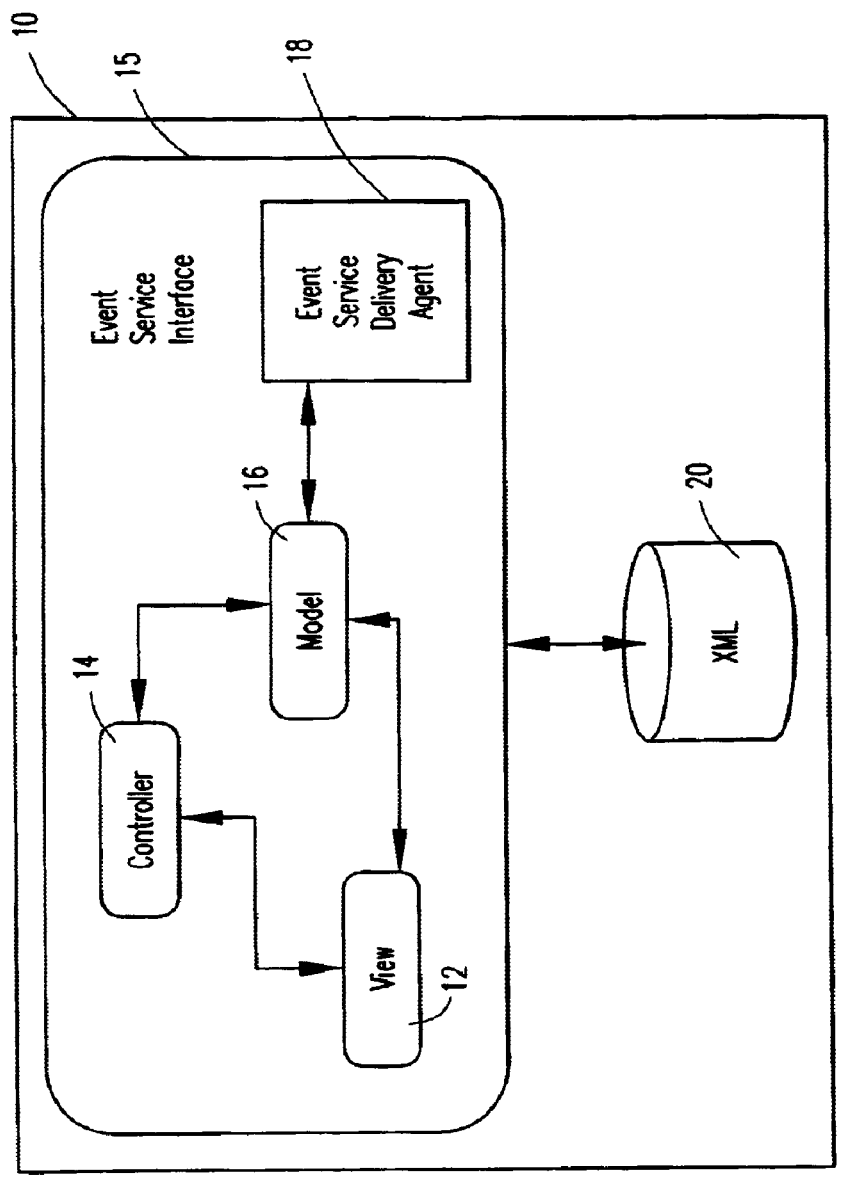
FIG. 1 illustrates an exemplary view of an Application Architecture.

Specifically, FIG. 1 illustrates an exemplary view of an Application Architecture 10. As shown, the exemplary architecture includes a View 12 component, a Controller 14 component, a Model 16 component, an Event Service Delivery Agent 18, an Event Service Interface 15 and an XML 20 configuration.

The Model 16 component manages information regarding the modeled architecture including tiers, components, communication paths and events. This component receives events via the generic middleware and protocol independent event service interface, and may selectively map these events to the view where they are visualized. However, the Model and Event Service Interfaces 15 that the Model 16 component uses to listen for events are not pluggable. These interfaces are the core of the application.

The View 12 component manages the presentation that determines the "look" of the application. Note that different looks are required for different uses of the present invention. For example, in a prototype or demonstration mode, the view implementation that is plugged into the present invention through an XML 20 configuration change should purposely slow down event visualization to give users time to understand the system behavior. On the other hand, in a mode where the present invention is monitoring a real deployed system, the view cannot afford to slow down the visualization of events, of which hundreds may be arriving per second. In this case, the view implementation plugged into the present invention may more appropriately visualize system behavior based on event frequency, for example, using different path colors or thicknesses to represent communication path activity. The View 12 component receives visualization events from the Model 16 component and displays these as specified in the XML 20 configuration. It also receives GUI events from the user and forwards these to the Controller 14 component where necessary.

The Controller 14 component manages behavior of the application, effectively determining its "feel." This component receives events from the Model 16 and View 12 components, and responds by collaborating with the Model 16 or View 12 component to handle these events. The particular implementation of the Controller 14 component is specified in the XML 20 configuration for the application and may therefore be swapped in order to change the "feel" of the application.

Figure 2:
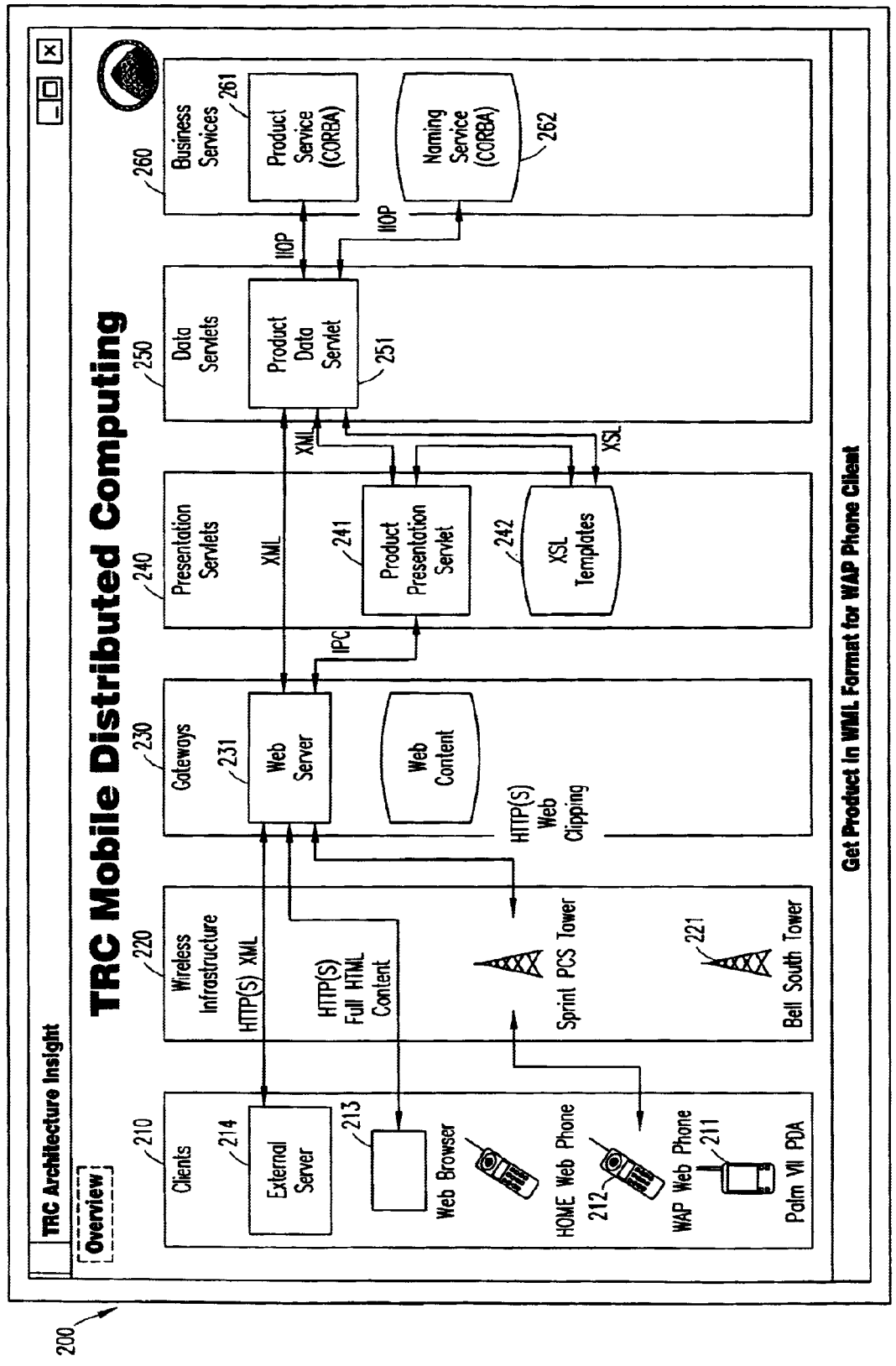
FIG. 2 illustrates a Simple View Example.

The Event Service Delivery Agent 18 manages how the event service is delivered to the application. This component is based on the TRC Service Delivery Framework, as illustrated in FIG. 2. This The Event Service Delivery Agent 18 is implemented as a single class with minimal responsibilities, since it is the component that is switched to adapt the present invention to any system that uses any middleware or protocol. At initialization time, this component is responsible for locating the local or remote implementation of the event service to which it will delegate requests. At runtime, this component is responsible for receiving events and forwarding them in the form of callbacks on the Model 16 component. If the event service implementation is remote, this delegation may involve the bidirectional translation of types from the generic Event Service Interface 15 (shown in FIG. 1) to the middleware or protocol specific types of the remote event service implementation. The particular implementation of this component is defined in the XML 20 configuration and may therefore be swapped in order to adapt the present invention to different uses or systems. For example, in a standard middleware known as the Common Object Request Broker Architecture (CORBA) system, the delivery agent may collaborate with the CORBA Event Service using Internet Inter-ORB Protocol (IIOP). The Object Request Broker (ORB) provides all the communication infrastructure needed to identify and locate objects, handle connection management and deliver data and request communication. However, in an MQ Series based system, the delivery agent may collaborate with the system via message queues.

With further reference to FIG. 2, there is illustrated an architecture that facilitates mobile distributed computing with XML. In this Simple View Example, the illustrated architecture is used to deliver product browsing services that allow clients to specify a category of product and browse all products available in the given category. The concepts presented here, however, may be applied to deliver other more complex services in the same way. A detailed description of the actors and components in this architecture, in particular their roles, responsibilities, and how they collaborate to deliver the same service to a variety of clients in a variety of different formats, is provided below.

Three actors are shown as "tier one clients" 210 in the architecture. The first actor, the Mobile User, is using a PalmVII PDA 211 to access services wirelessly and a Wireless Application Protocol (WAP) Web Phone 212 to easily access services and information instantly over the Internet. Similarly, the Web User is using a standard PC running a web browser 213, such as Netscape or Internet Explorer, to access services directly over the Internet. Likewise, the External Server 214 represents a server that accesses services directly over the Internet and represents a dependent server in an extranet or collaborative e-commerce network. Note that many other types of tier one clients may interact in this architecture. All tier one clients may communicate with the Web Server using either Hypertext Transport Protocol (HTTP) or secure HTTP (HTTPS) as specified by the application.

The BellSouth Tower 221 component is a cellular base station in the Wireless Infrastructure 220. It receives requests for services in the form of wireless signals sent from a Palm VII PDA 211, forwards these requests to the Palm.net data center for processing, and finally relays the results back to the Palm VII 211. Note that the requests and replies sent between the Palm VII PDA 211 and the base station 221 are secure and compressed. The Palm.Net Data Center Proxy component (not shown) is a bank of proxy servers that receive requests for Internet-based services from clients 210 via base stations. The proxy first decrypts and decompresses each request and then forwards it to the target Web Servers 231 for processing. Finally, the proxy compresses and encrypts the replies and then forwards them back to the clients 220, again via the base stations. Note that the communications between the proxy and Web Servers 231 may use either HTTP or HTTPS, as specified by the application. The format of the information in this case is a proprietary "Web Clipping" format defined by Palm Computing that is specialized for the Palm VII 211 mobile device.

The Web Server 231 component is responsible for receiving requests from any type of client 210 over the Internet via either HTTP or HTTPS, and either handling or dispatching these requests for processing. In the case of the example architecture, the Web Server 231 dispatches incoming requests to servlets 240 that act as gateways 230 to back-end distributed systems. The JRun Servlet Engine component (not shown) is responsible for hosting application servlets 240 and providing them with a standards-compliant servlet interface. A key advantage of using JRun instead of running the servlets 240 inside the Web Server process itself, is that JRun provides a standard servlet API and decouples the servlets 240 from the specific implementation details of the Web Server 231. This buys architectural flexibility in facilitating swapping of the Web Server 231 with no impact on the overall system. The servlet engine also provides various management and debugging features and shifts the load of servlet processing away from the Web Server 231.

The Product Data Servlet 251 component is a gateway servlet responsible for receiving requests from the Web Server 231 for product information and forwarding these requests to the CORBA Product Service 261 using Internet Inter ORB Protocol (IIOP) for processing. After processing, it receives the results from the CORBA Product Service 261, reformats them in the form of XML, and forwards them back to the Web Server 231 for delivery to the client 210. Note that the CORBA Naming Service 262 is used by this servlet 251 at startup to locate the CORBA Product Service 261.

The Product Presentation Servlet 241 component is another gateway servlet responsible for receiving requests from the Web Server 231 for product information from various types of clients 210. It identifies the type of client 210, either explicitly from parameters forwarded by the client with the request, or implicitly from header information associated with the HTTP or HTTPS request. It forwards the request to the Product Data Servlet 251 using a servlet chaining approach and receives the results of the request in the form of XML. The servlet 251 then retrieves an XSL template 242 from the XSL Transformations repository (not shown) for the identified client 210 and uses it to automatically reformat the XML results into a format appropriate for the given client 210. Finally, the servlet 251 forwards the reformatted product results back to the client 210 via the Web Server 231.

The XSL Transformations repository component stores the XSL templates 242 used to automatically transform the product information results from the base XML format into a format appropriate for a particular client 210.

The XML Data repository component (not shown) stores static content and provides access to it in XML format. This is in contrast to dynamic content in XML format generated "on the fly", for example, by the Product Data Servlet 251. The XML Data repository enables the architecture illustrated in FIG. 2 to expose both static and dynamic content for use either in its base XML or a derived form. For example, in one scenario the Web Server 231 may publish static XML data from the XML Data repository directly to an External Server 214. Alternatively, the XML Data repository may provide static XML data to a presentation servlet (for example, the Product Presentation Servlet 241) for transformation according to an XSL template 242 into a format appropriate for a particular type of client 210.

The CORBA Naming Service 262 component provides directory-based publication and lookup services. When CORBA servers (for example, the CORBA Product Service 261) start up, they may publish themselves to the CORBA Naming Service to facilitate subsequent lookup by CORBA clients (for example, the Product Data Servlet 251). This component provides location transparency in the CORBA distributed system. The CORBA Product Service 261 component is a CORBA business service 260 responsible for publishing itself to the CORBA Naming Service 262 at startup, and subsequently processing requests from CORBA clients for product information.

The present invention is highly configurable. A configuration is specified using XML 20. This configuration is read during initialization at application startup and includes both high level and detailed configuration information. High level configuration information includes, for example, the particular implementations of the components to use to implement the View 12, Controller 14 and Event Service Delivery Agent 18 components, while more detailed information may be split into the four categories outlined as follows: (1) abstract information in the form of tiers, components, communication paths and events may be configured in the XML 20 to model an architecture of arbitrary complexity; (2) presentation information in the form of how many display views are required to present the architecture, and how to respond visually when events are received; (3) controller information that may specify details that determine how the particular controller implementation behaves; and (4) integration information that may be used by the particular implementation of the Event Service Delivery Agent 18. This information may be required, for example, in order for the agent to collaborate with the system being monitored.

The goal in modeling an architecture is to create a configuration in XML 20 format that describes a model of the architecture to visualize, as well as how to present it. The configuration is represented in XML 20 that is both well-formed and valid according to a Document Type Definition (DTD). It is the elements of the DTD that define the scope of configurability of the present invention. In this discussion, graphical views of the DTD elements will be used to concisely and clearly present their meaning. In this graphical presentation, each XML element or tag is represented as a blue box. Elements to the left are parent of elements to the right to which they are connected using red lines. Elements in the same vertical tier that have the same parent are siblings. These relationships translate in a straightforward manner into the well established tag nesting paradigm established in XML 20.

Figure 3:
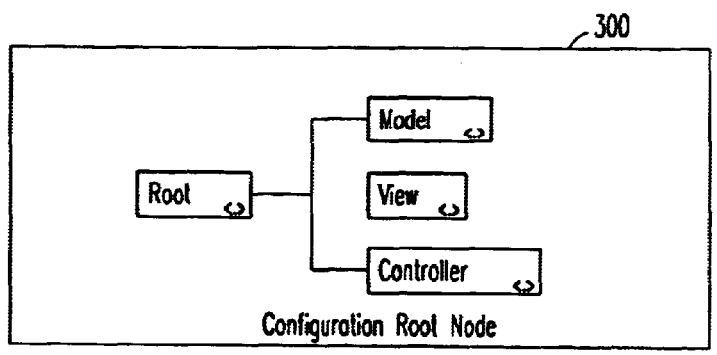
FIG. 3 illustrates a Configuration Root Node which may contain three children that include the Model 16, View 12 and Controller 14 elements.

Referring now to FIG. 3, there is illustrated a Configuration Root Node 300. The root element of any configuration in the present invention is the node that contains three children that include the Model, View and Controller elements. As their name implies, there is a close relationship between these elements and the application architectures as shown, for example, in FIG. 1.

Figure 4:
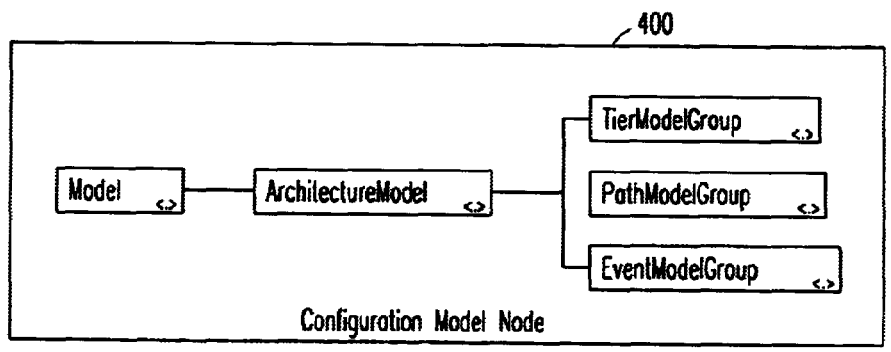
FIG. 4 illustrates a Configuration Model Node which may contain the ArchitectureModel element that in turn contains the TierModelGroup, PathModelGroup and EventModelGroup elements.

Referring now to FIG. 4, there is illustrated a Configuration Model Node 400. The Model element contains the ArchitectureModel element that in turn contains the TierModelGroup, PathModelGroup and EventModelGroup elements. The TierModelGroup element contains abstract (non-presentation) information required to model the tiers of the architecture including, for example, the names of the tiers and the components they contain. All tiers of the architecture are configured here, however, note that the present invention may be configured to view only a subset of these at a time as shown subsequently in the discussion of the view configuration.

A communication path is defined here as a collaboration between any two components in the architecture. The PathModelGroup element is configured with the abstract information regarding all communication paths in the architecture, even though only a subset of these paths may be shown at a time in any given view.

The EventModelGroup element is used to specify the details of all events to which the present invention will listen and respond visually.

Referring now to FIG. 5, there is illustrated a Configuration TierModelGroup Node 500. The TierModelGroup element contains one or more TierModel elements, each of which is configured with a ComponentModelGroup element that in turn contains one or more ComponentModel elements. Note that all components in the tier are configured here. However, the present invention may be configured to view only a subset of these components at a time. FIG. 5A and FIG. 5B describe the valid attributes for the TierModel 500A and ComponentModel 500B elements respectively.

Figures 6, 6A:
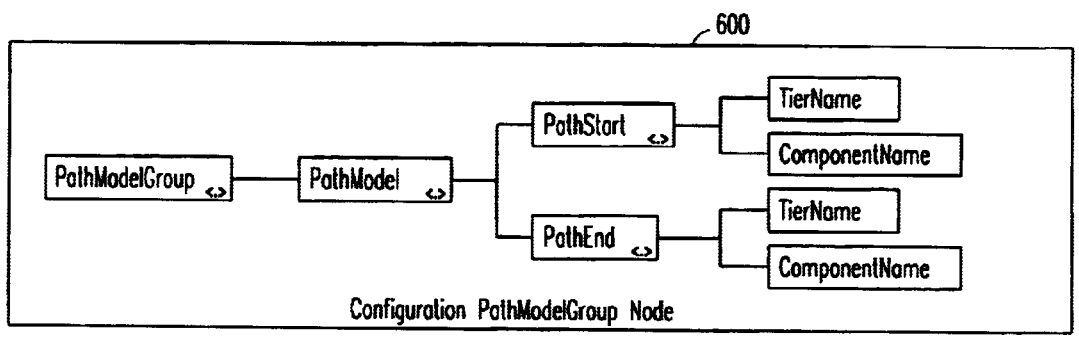
FIG. 6 illustrates a Configuration PathModelGroup Node which may contain zero or more PathModel elements.
FIG. 6A describes the valid attributes for the PathModel element.

Referring now to FIG. 6, there is illustrated a Configuration PathModelGroup Node 600. The PathModelGroup contains zero or more PathModel elements. Each communication path is configured using a PathModel element and has a startpoint and an endpoint. Each of these points is specified at an abstract level by a tier and component where the names of the tier and component in each case are configured in the value of the TierName and ComponentName elements respectively. These tiers and components refer to tiers and components specified previously in the configuration under the TierModel elements. FIG. 6A describes the valid attributes of the PathModel 600A element.

Figures 7, 7A, 7B:
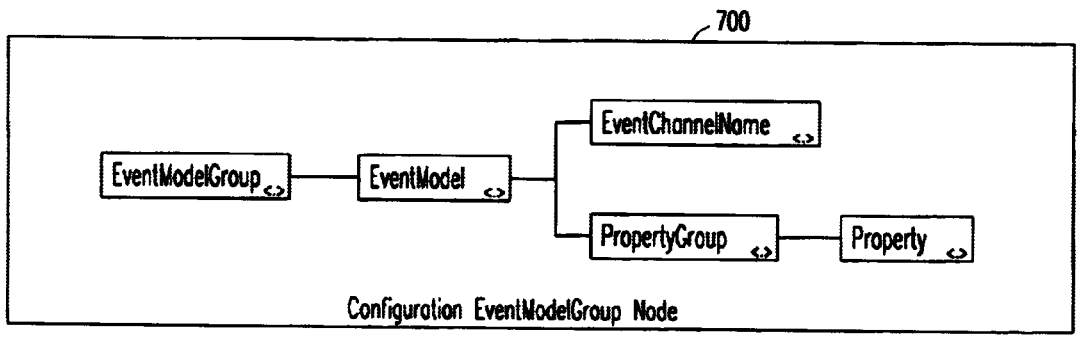
FIG. 7 illustrates a Configuration EventModelGroup Node which may contain zero or more EventModel elements.
FIG. 7A describes the valid attributes for the Event element.
FIG. 7B describes the valid attributes for the Property element.

Referring now to FIG. 7, there is illustrated a Configuration EventModelGroup Node 700. The EventModelGroup element contains zero or more EventModel elements, each of which defines an event that the present invention recognizes. Each event that the present invention listens to through the generic Event Service interface shown in FIG. 2 is specified by an event channel name in the value of the EventChannelName element, and zero or more name/value property pairs specified in the Property element (s) contained by the PropertyGroup element. The present invention will only consider a given event to have occurred when an event is received from the named event channel and the received event has the specified name/value property pairs. Note that a received event may optionally have more name/value property pairs, but must have at least the configured name/value properties for the present invention to trigger an internal event based on the received event. In this way, the present invention may be configured to filter events and only respond to events of interest to the viewer. FIG. 7A and FIG. 7B describes the valid attributes for the Event 700A and Property 700B elements respectively.

Figure 8:
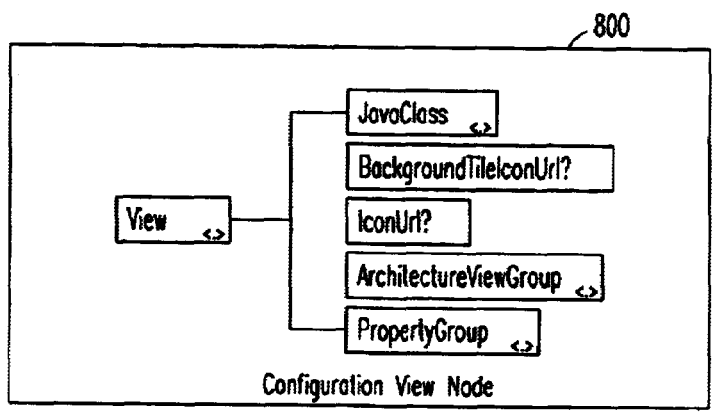
FIG. 8 illustrates a Configuration View Node which may contain the information required for a presentation.

Referring now to FIG. 8, there is illustrated a Configuration View Node 800. The View element contains the information required for a presentation. It must contain a JavaClass element that specifies the implementation of the view to use. For example, to use the basic view bundled with the present invention, one may set the value of this element to com.trcinc.tools.insight.view.basic.ViewImplementation.

This basic view lays out components and tiers in a simple grid layout, the cell size of which is determined automatically by the largest component used in the view(s). To change the view implementation, one may implement an alternative view, for example in com.trcinc.tools.insight.view.myview.MyViewImplementa-tion. Any valid view implementation class must implement the com.trcinc-.tools.in-sight.view.ViewListener interface and must be public.

The background texture of the present invention view may optionally be specified with the BackgroundTileIconUrl element, the value of which should contain a valid URL that refers to the image to tile in the background of the view behind the architecture tiers. For example, a gray textured background is used in the view shown in FIG. 2.

An icon may optionally be specified in the IconUrl element for a logo to go on the view at the top right. The value of this element is again a valid URL that refers to the image for the icon to use. For example, the TRC logo is used in the view shown in FIG. 2.

The View element also contains an ArchitectureViewGroup element that in turn may contain one or more ArchitectureView elements. Each ArchitectureView element corresponds to a tab of the final view. This enables the present invention to show any architecture of arbitrary complexity by splitting it up into multiple views. The tiers and components shown in any given view are generally chosen as the components involved in one or more related use cases. For example, the view show in FIG. 2 contains a single ArchitectureView element represented in the single tabbed pane with the title "Overview". FIG. 9A shows the attributes that may be added to the ArchitectureView 900A element. FIG. 9B shows the Optional View Properties representation which can be used for a basic view implementation 900B.

Zero or more name/value property pairs may also be configured for the View element in the child Property element(s) contained by the PropertyGroup element. The actual name/value pairs used for these elements are arbitrary and may be used to convey specific configuration information required by a particular view implementation. Where more complex configuration information must be conveyed to the View element than may be represented in the form of simple name/value property pairs, these properties may be used to refer to another more sophisticated configuration source, for example, by specifying an URL to another configuration document.

Referring now to FIG. 9, there is illustrated a Configuration ArchitectureView Node 900. Each tabbed pane of the present invention view has a tab name specified by the value of the child DisplayTabName element, a title specified by the value of the child DisplayName element, one or more TierView elements contained by the TierViewGroup element, and zero or more EventView elements contained by the EventViewGroup element. Each TierView element specifies a tier of the architecture that must be presented in that view and corresponds to a valid tier of the architecture specified previously using a TierModel element. Each EventView element specifies and event that should generate some visual response in the given view, for example, a path highlight. Each of these events correspond to valid events configured previously using EventModel elements. Furthermore, each of these EventView elements contains all of the information regarding what visual response to display in the given view when the associated event is received. FIG. 10A describes the valid attributes for the DisplayName element.

Referring now to FIG. 10, there is illustrated a Configuration TierView Node 1000. For each TierView element, the corresponding displayed tier contains a title specified as the value of the DisplayName child element. Zero or more components may also be displayed using the ComponentView element(s) contained by the ComponentViewGroup element. Each displayed component may optionally have a title specified by the value of the DisplayName child element. A displayed component may also optionally have icons for its inactive and active states specified by the value of IconUrl and HighlightIconUrl child elements respectively. If an element is not assigned a title or any icons, then it will be invisible on the display. This is a valid use case, for example, where one wants to insert space between components in a tier. FIG. 10A, FIG. 10B and FIG. 10C discuss the valid attributes for the DisplayName 1000A, TierView 1000B and ComponentView 1000C elements respectively.

Referring now to FIG. 11, there is illustrated a Configuration EventView Node 1100. The EventViewGroup node may contain zero or more EventView elements that may each be used to specify visual behavior that occurs as a result of an associated event being received. A text status message may optionally be specified in the value of the Message child element. This message is displayed in the status bar at the bottom of the present invention display whenever an instance of the associated event is received. The main visual behavior that the present invention shows when an event is received is communication path and associated component highlights. Zero or more PathView child elements contained by the PathViewGroup element may be used to specify the exact visual behavior that must occur when a new event is received. PathView child elements that are siblings of the same parent node will be shown sequentially. In other words, visualization associated with the first PathView element will complete before visualization associated with the second sibling PathView element commences and so forth. Note that PathView elements may also be nested. In other words, a PathView element may contain another PathView element. In this case, the highlighting associated with the parent PathView element will remain active until the highlighting associated with all of its child elements has completed. This parent/child usage of PathView elements is typically used for visualization in the case of a nested synchronous type of communication. The PathView element refers to valid PathModel elements specified previously. Sometimes it is desirable to have a component remain highlighted independent of a path highlight, for example, in an asynchronous store and forward type of communication. In this case, a ComponentHighlightView element contained by the ComponentHighlightViewGroup element may be used to specify the start and end of the component highlight. Note that both the start and end points of the highlight must be fixed with respect to the point in time at which the associated event arrives. FIG. 11A, FIG. 11B and FIG. 11C describe the valid attributes of the EventView 1100A, PathView 1000B and ComponentHighlightView 1000C elements respectively.

Figure 12:
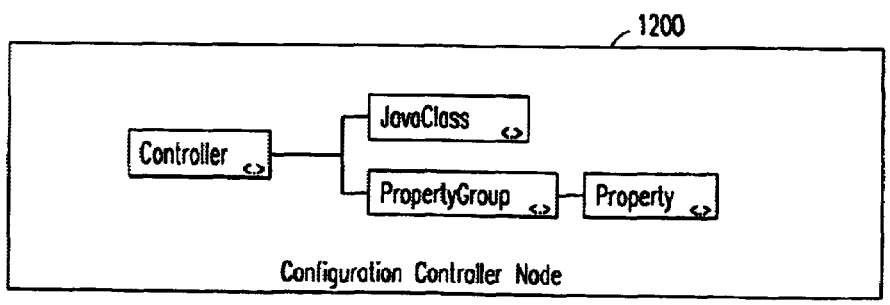
FIG. 12 illustrates a Configuration Controller Node which determines the "feel" or behavior of an application.

Referring now to FIG. 12, there is illustrated a Configuration Controller Node 1200. The controller determines the "feel" or behavior of the application. The particular implementation of the controller to use is configurable and specified by the value of the JavaClass child element. For example, to use the basic controller implementation bundled with the present invention, the value of this element would be set to com.trcinc.tools.insight.controller.basic.ControllerImplementation.

An alternative controller may be written and plugged into the application. Any valid controller should implement the com.trcinc.tools.insight.con-troller.ControllerListener interface and should be public. Furthermore, a new controller should be put in a sibling package to the basic package, for example, a new controller could be implemented in com.trcinc.tools.insight.control-ler.myController.MyControllerImplementation.

Zero or more arbitrary name/value property pairs may be conveyed to the controller implementation via the Property child elements contained by the PropertyGroup element. These properties may be used, for example, to convey specific information required by a particular implementation of a controller. Where more complex configuration information is required than may be represented in simple name/value property pairs, these properties may be used to refer to a more sophisticated configuration source. For example, a property may be used to specify an URL for another XML configuration document required by the controller implementation.

Figure 13:
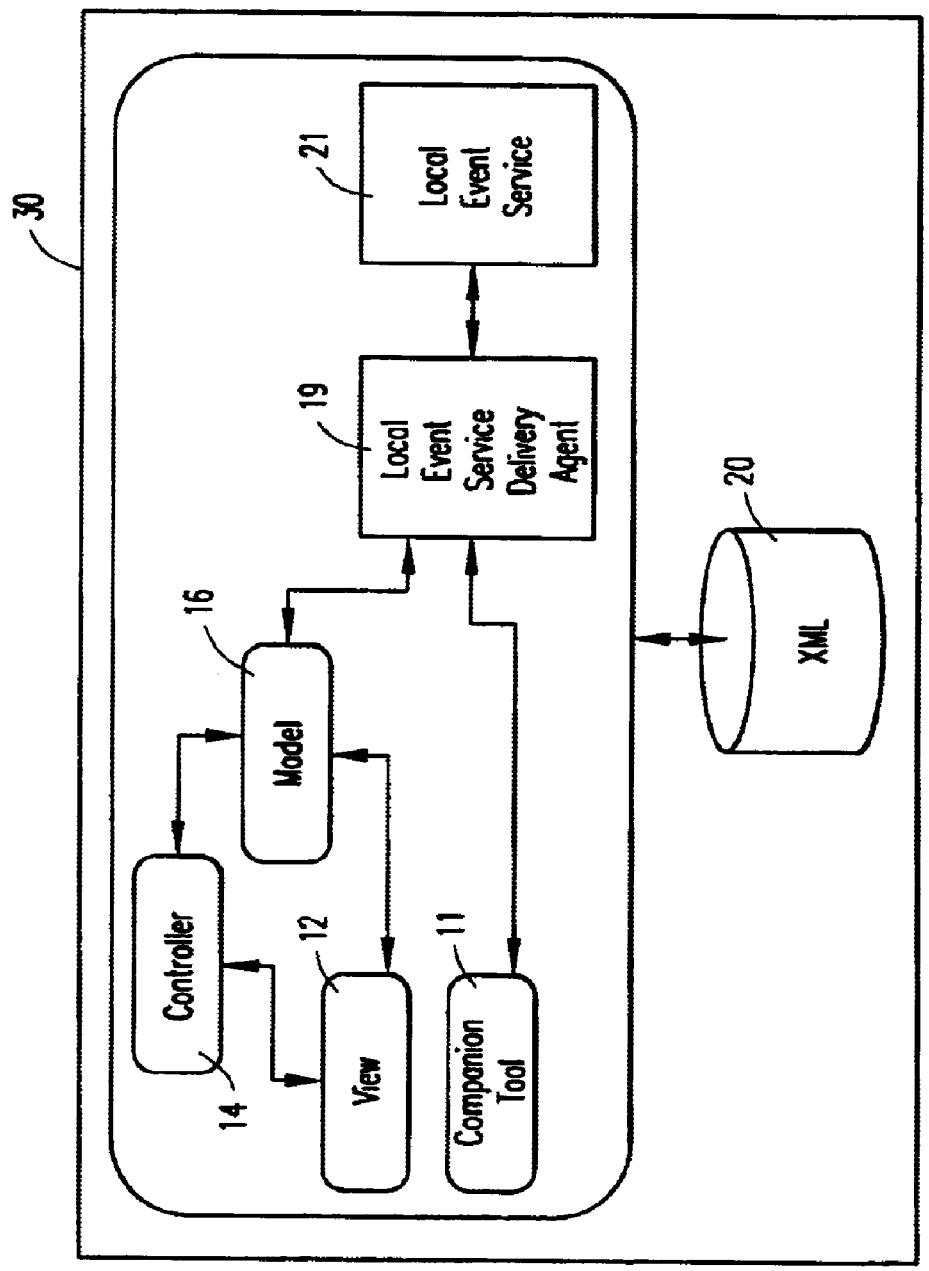
FIG. 13 illustrates an exemplary view of an Application Architecture for Viewing in Simulation Mode.

Referring now to FIG. 13, there is illustrated an exemplary view of an Application Architecture for Viewing in Simulation Mode 30. As shown, the exemplary architecture 30 includes a Companion Tool 11, a View 12 component, a Controller 14 component, a Model 16 component, an XML 20 configuration, a Local Event Service Delivery Agent 19 and a Local Event Service 21.

The goal of this use case 30 is to communicate specific architectural collaborations before implementation, for example, during the conceptual and prototype stage before development starts.

Figure 14:
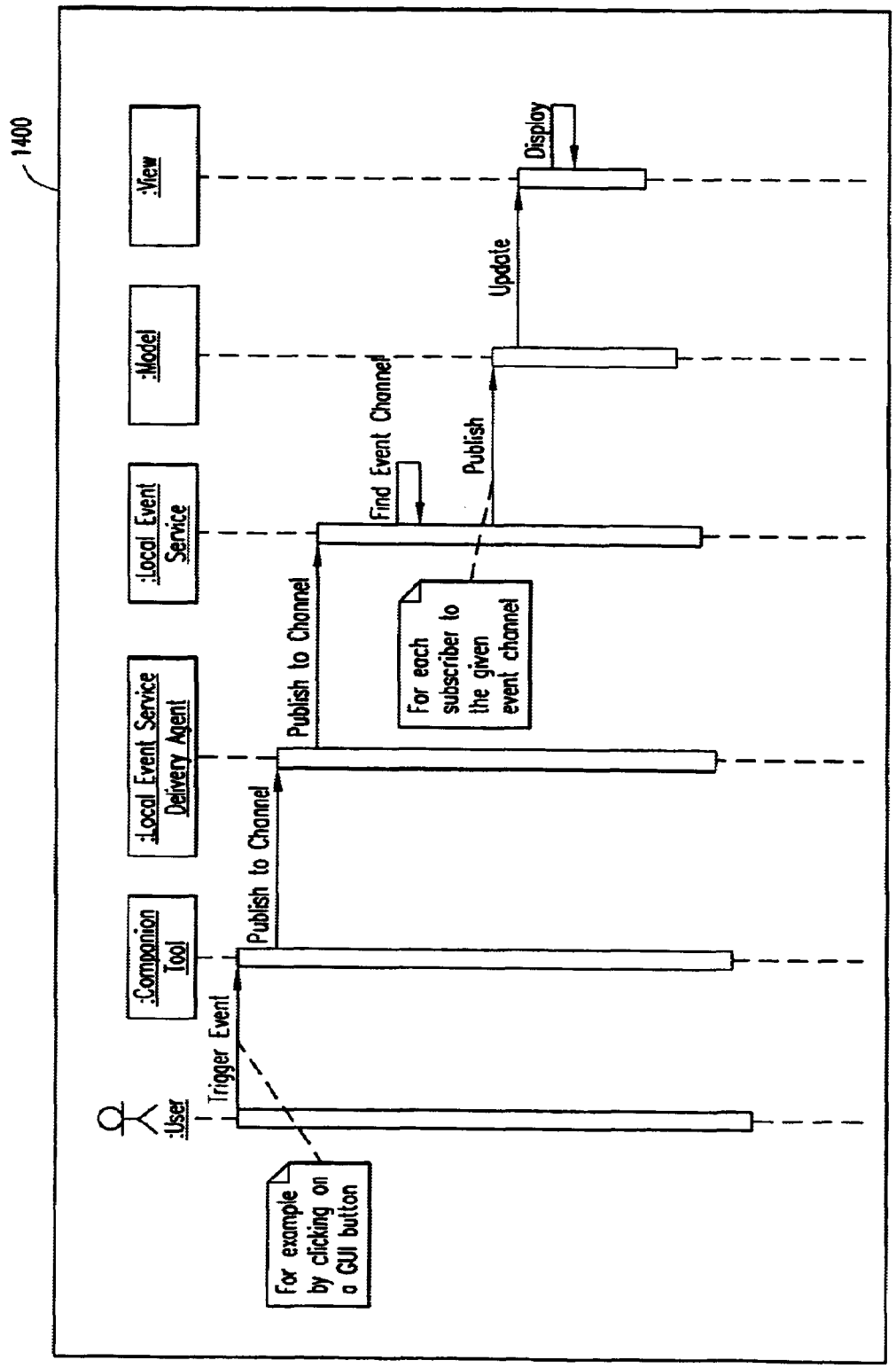
FIG. 14 illustrates a Normal End to End Scenario for Viewing an Architecture in Simulation Mode.

Referring now to FIG. 14, there is illustrated a Normal End to End Scenario for viewing an Architecture in Simulation Mode 1400. There are two key differences in this use case 30:

The companion tool is implemented and runs in the same process as the application. At initialization time, the companion tool reads the same XML 20 configuration as the present invention and, therefore, knows the events that the present invention is listening to. The companion tool then displays a GUI with buttons that enables the user to manually fire events; and The implementation of the Event Service Delivery Agent 18 used in this case is the Local Event Service Delivery Agent 19. This particular delivery agent delegates requests from either the Model 16 component or the companion tool to a lightweight implementation of the Local Event Service 21 that is running in the same process.

Figure 15:
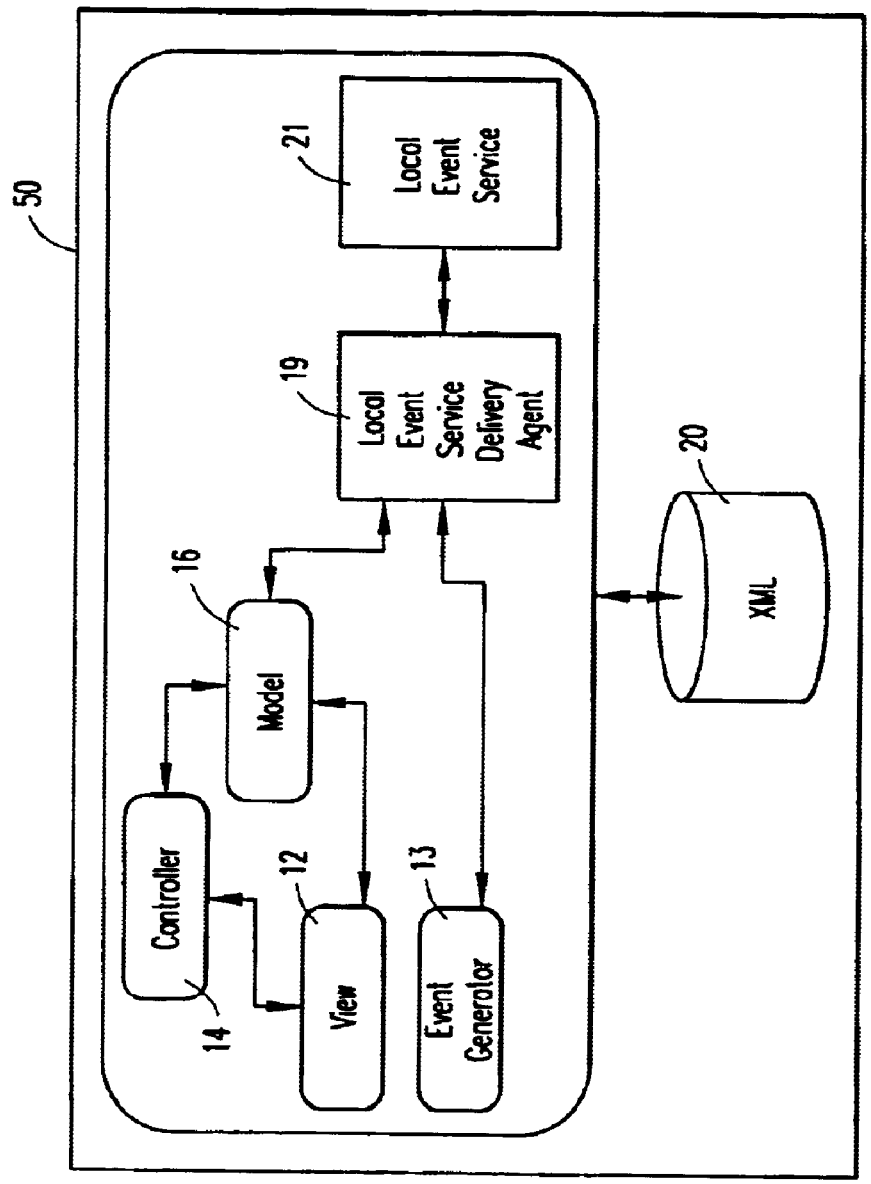
FIG. 15 illustrates an exemplary view of an Application Architecture for Viewing in Auto-Cycle Mode.

Referring now to FIG. 15, there is illustrated an exemplary view of an Application Architecture for Viewing in Auto-Cycle Mode 50. As shown, the exemplary architecture 50 includes an Event Generator 13, a View 12 component, a Controller 14 component, a Model 16 component, an XML 20 configuration, a Local Event Service Delivery Agent 19 and a Local Event Service 21.

The goal of this use case 50 is to communicate all modeled architectural collaborations in a continuous, free-running mode, for example, in demonstrations at conferences.

Figure 16:
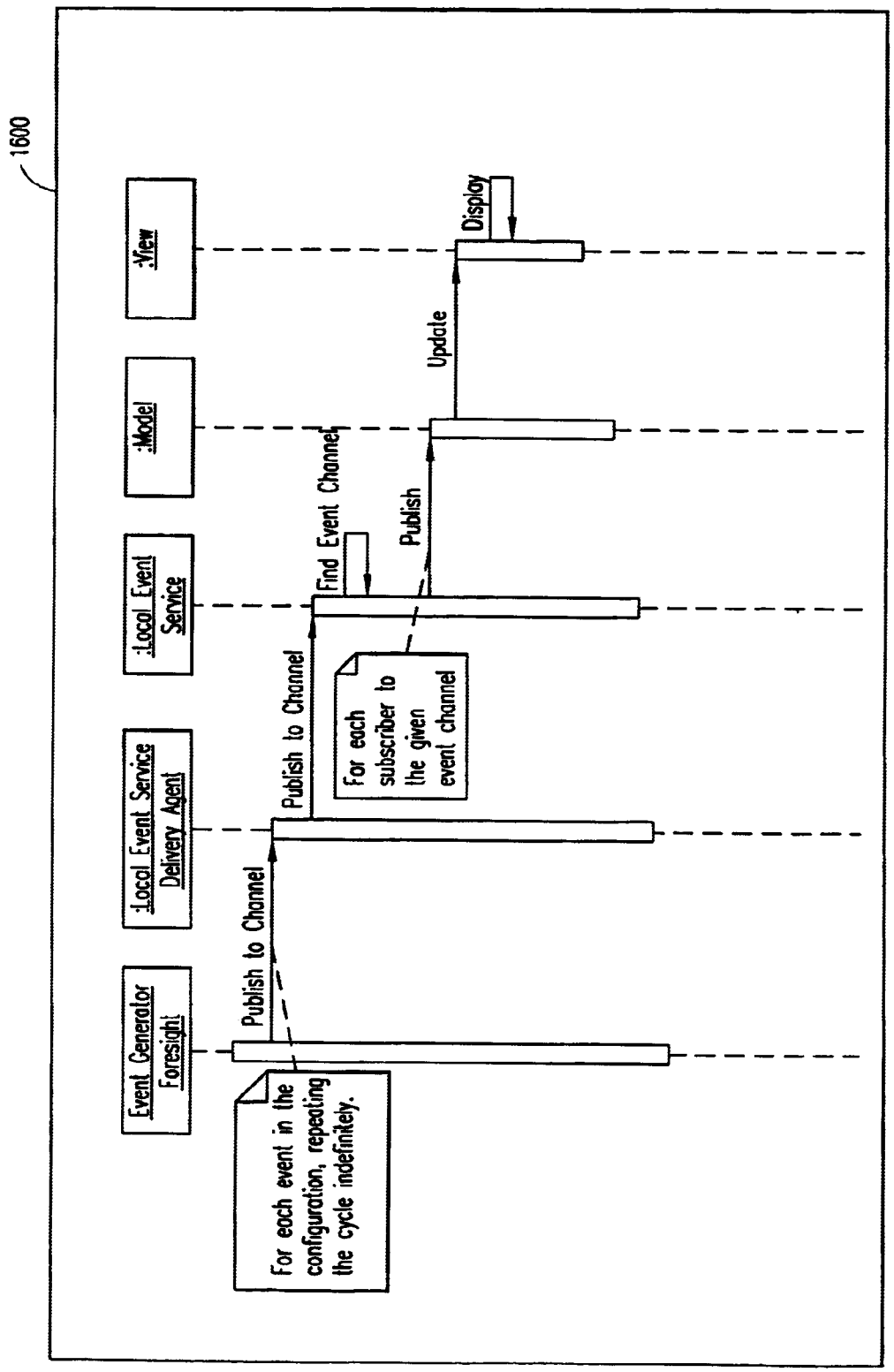
FIG. 16 illustrates a Normal End to End Scenario for Viewing an Architecture in Auto-Cycle Mode.

Referring now to FIG. 16, there is illustrated a Normal End to End Scenario for viewing an Architecture in Auto-Cycle Mode 1600. here are two key differences in this use case 50:

The Event Generator 13 is implemented. Like the companion tool in the previous use case, the Event Generator 13 reads the XML 20 configuration as the present invention at startup. The Event Generator 13, therefore, also understands the events that the present invention is listening to. It computes the intervals and order in which to fire the events and then begins firing these events in a continuous repetitive cycle; and The implementation of the Event Service Delivery Agent 18 used in this case is the same Local Event Service Delivery Agent 19 that again delegates to the lightweight implementation of the Local Event Service 21 running in the same process.

Figure 17:
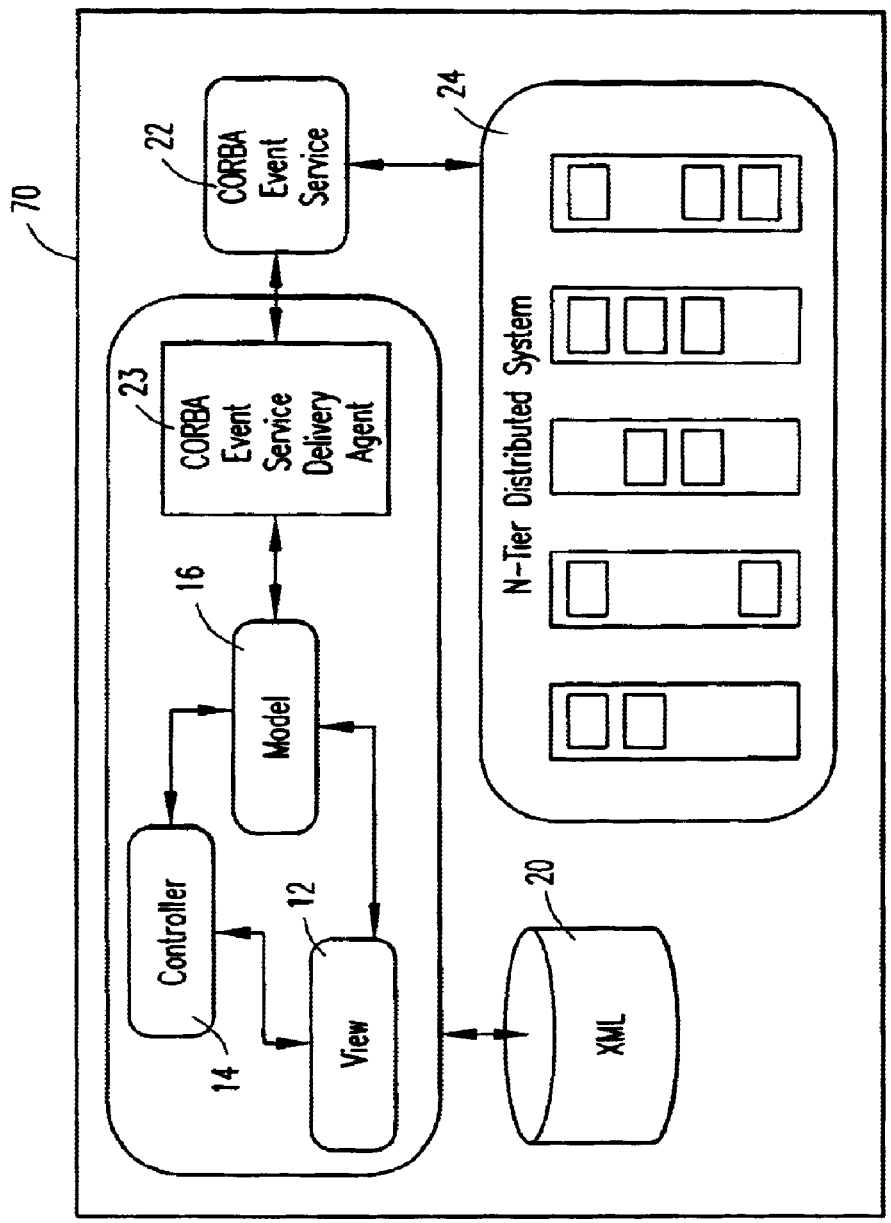
FIG. 17 illustrates an exemplary view of an Application Architecture for Viewing a Deployed Implementation of an Architecture.

Referring now to FIG. 17, there is illustrated an exemplary view of an Application Architecture for Viewing a deployed implementation of an Architecture 70. As shown, the exemplary architecture 70 includes a View 12 component, a Controller 14 component, a Model 16 component, a CORBA Event Service Delivery Agent 23, a CORBA Event Service 22, an XML 20 configuration and an N-Tier Distributed System 24.

The goal of this use case 70 is to visualize real system behavior, for example, during development, demonstrations or general system administration during deployment.

Figure 18:
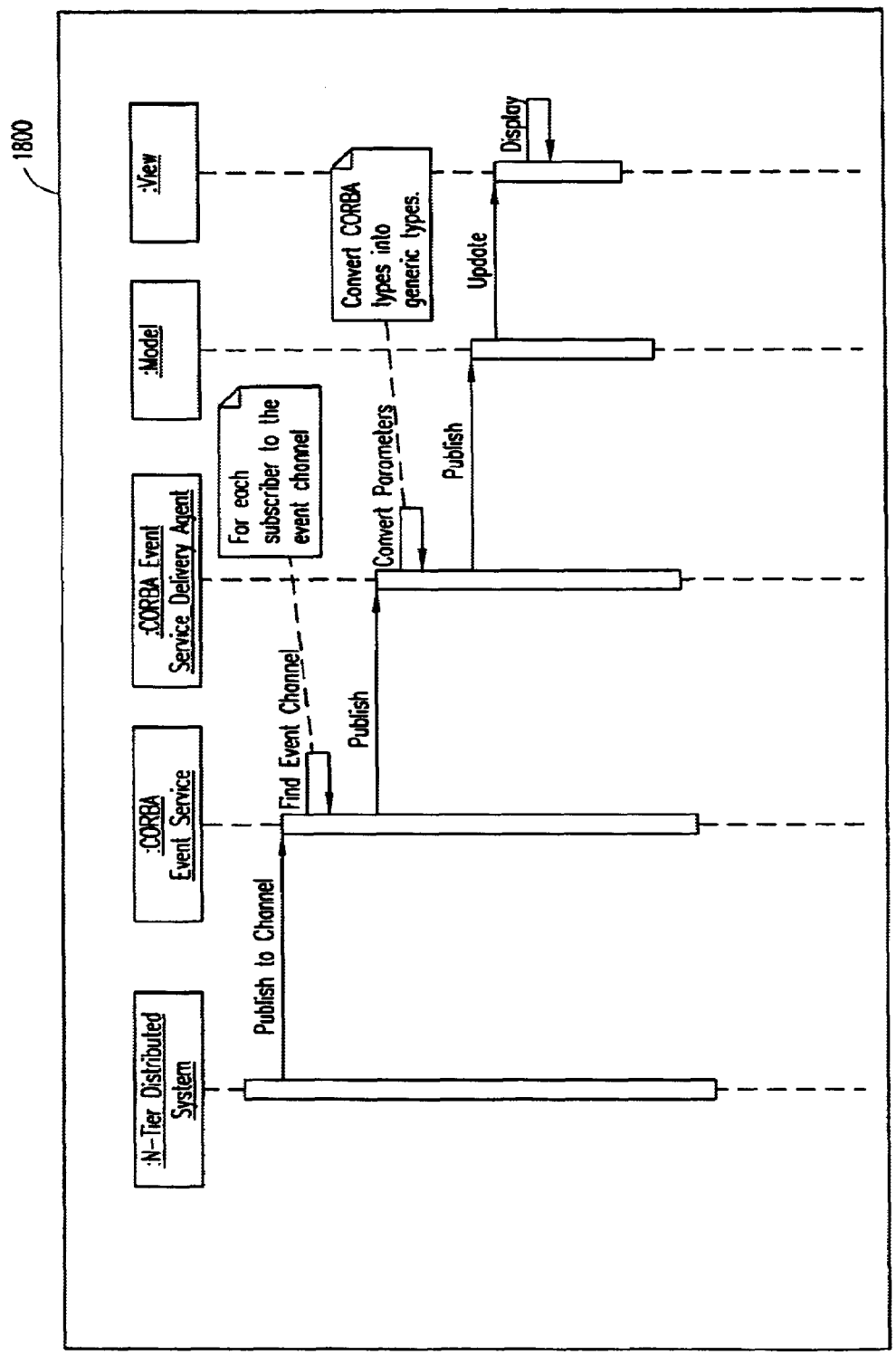
FIG. 18 illustrates a Normal End to End Scenario for Viewing a Deployed Implementation of an Architecture.

Referring now to FIG. 18, there is illustrated a Normal End to End Scenario for viewing a Deployed CORBA Implementation of an Architecture 1800. There is one key difference in this use case 70:

The implementation of the Event Service Delivery Agent 18 used is the CORBA Event Service Delivery Agent 23. At startup, this agent locates the remote standard CORBA Event Service 22. At runtime, this agent receives requests from the Model 16 component, reformats generic types associated with the requests to CORBA types where necessary, and delegates these requests to the remote event service. For example, this occurs when the Model 16 component subscribes the event channels it will monitor. At runtime, the delivery agent also receives callbacks from the CORBA Event Service 22, for example, when new events are published. Where CORBA specific types or exceptions are present in collaborations between the agent and event service, the agent also serves to convert these types to and from generic types that may be returned to the Model 16 component through the generic Event Service Interface 15. Note that the CORBA Event Service Delivery Agent 23 uses only the untyped push support provided by the CORBA Event Service 22.

Note that, although in this case, CORBA is used for the middleware and implementation of the event service, any other middleware and event service implementation could be used through suitable implementation of an associated Event Service Delivery Agent 18. The XML 20 configuration for the present invention could then be updated to specify the use of this new agent.

In this way, the present invention may be adapted to any system that uses any middleware or protocol to communicate.

The current implementation of the present invention uses the Java JDK1.2 and is under the package com.trcing.tools.insight, which includes sub-packages. It depends on the TRC Component Framework that lives under the package com.trcinc.framework, and in particular the TRC Service Delivery Framework that lives under com.trcinc.frameworks.delivery. The XML4J Java XML API from IBM is used to parse XML configuration documents. Only the standard interface of the XML4J API is used. Therefore any other standards compliant XML API could be used in plase of XML4J.

The basic view implementation that is bundled with the present invention is designed specifically for demonstrations and conferences and supports use during prototyping, development and deployment as long as event generation is controlled either directly using the companion tool, or indirectly through some application client. This view shows a purposely delayed response to incoming events in order to give users time to understand the nature of the collaboration that is taking place. For this reason, this view is not suitable for visualizing behavior of a real deployed system that may generate hundreds or thousands of events per second. For this, another view should be written and may be "plugged" into the application as previously discussed in the first use case. The classes that implement the basic view may be found in the com.trcinc.tools.insight.view.basic Java package. A new view implementation should be introduced as a sibling to the basic package. For example, an xxx view should be added under the package com.trcinc.tools.insight.view.xxx.

The basic controller implementation bundled with the present invention is lightweight, and since the viewer is primarily output rather than input biased, the controller does not have a lot of responsibility. The basic controller implementation lives under the com.trcinc.tools.insight. controller.basic Java package. A new controller implementation should be introduced as a sibling to the basic package. For example, an xxx controller should be added under the package com.trcinc.tools.insight.controller.xxx.

It should be understood that both the present invention and companion tool are highly configurable tools that may be used to visualize any architecture with any view and may be adapted to any system implementation, regardless the middleware implementation used for that system.

Although the presently preferred embodiments are directed toward systems and methods that facilitate system developers in the modeling of an architecture through XML 20 configuration to increase understanding of system architectures and behaviors through visualization, it should also be understood that the principles of the present invention may be implemented in a variety of different uses or systems, e.g., in a CORBA system.

As will also be recognized by those skilled in the art, the innovative concepts described in the present application can be modified and varied over a wide range of applications. For example, although the embodiments are shown in a distributed environment, the invention is not limited to such an architecture and can be practiced in other application architectures, such as a message queuing application.

Accordingly, the scope of the present invention should not be limited to any of the specific exemplary teachings discussed, but is only limited by the following claims.

A list of tables and screen displays for the monitoring software and technique of the present invention are attached.

What is claimed is:

1. A method for visualizing an application architecture of a system including instructions embodied on a computer readable medium, said method comprising the steps of:
   receiving information regarding an event;
   determining a look of an application;
   determining a feel of the application;
   receiving events at an event service delivery agent; forwarding the events to a model component of the architecture in the form of callbacks;
   reading configuration information during initialization at application startup, wherein the configuration information is adaptable to a plurality of different middlewares;
   visualizing the architecture of the system during conceptual, development and deployment phases of the system;
   wherein the step of visualizing during the conceptual phase of the system is performed in a simulation mode to communicate architectural components and collaborations of the system before the architecture has been implemented in the development and deployment phases;
   wherein the step of visualizing during the development phase of the system is performed in either the simulation mode for sections of the system that have not yet been implemented or a mode for monitoring a deployed system for portions of the system that have already been implemented; and
   wherein the step of visualizing during the deployment phase of the system is performed in the mode for monitoring the deployed system.

2. The method of claim 1, wherein said step of visualizing comprises the step of visualizing a deployed implementation of the architecture.

3. The method of claim 1, wherein said configuration information further comprises:
   abstract information in the form of tiers, components, communication paths and events;
   visualizing information in the form of how many display views are required to visualize the architecture, and how to respond visually when events are received;
   controller information that may specify details that determine how the particular controller implementation behaves; and
   integration information that may be used by the particular implementation of an event service delivery agent.

4. An architecture visualization system including instructions embodied on a computer readable medium for visualizing an application architecture, said architecture visualization system comprising:
   a model component for receiving information regarding events;
   a view component for determining a look of an application;
   a controller for effectively determining a feel of the application;
   an event service delivery agent for receiving and delegating requests;
   a configuration specified in XML, wherein the configuration is adaptable to a plurality of different middlewares;
   wherein the visualization is performed during conceptual, development and deployment phases of the architecture visualization system;
   wherein the step of visualizing during the conceptual phase of the architecture is performed in a simulation mode to communicate architectural components and collaborations before the architecture has been implemented in the development and deployment phases;
   wherein the step of visualizing during the development phase of the architecture is performed in either the simulation mode for sections of the system that have not yet been implemented or a mode for monitoring a deployed system for portions of the system that have already been implemented; and
   wherein the step of visualizing during the deployment phase of the system is performed in the mode for monitoring the deployed system.

5. A system including instructions embodied on a computer readable medium for visualizing an application architecture, the system comprising:
   an event service interface for receiving middleware or protocol dependent events, the event service interface for translating the middleware or protocol dependent events into middleware or protocol independent events;
   an event service delivery agent for receiving the middleware or protocol independent events and managing delivery of events to an application;
   a model component for receiving middleware or protocol independent events from the event service delivery agent;
   a view component receiving middleware or protocol independent events from the model component, the view component for visualizing behavior of an application during at least one of conception, development, and deployment of the application;
   a controller for managing the behavior of the application, an implementation of the controller being adaptable based on the middleware communicating with the application;
   wherein the step of visualizing the behavior of the application during the conception of the application is performed in a simulation mode to communicate architectural components and collaborations before the development and deployment of the application architecture;
   wherein the step of visualizing the behavior of the application during the development of the application is performed in either the simulation mode for sections of the application architecture that have not yet been implemented or a mode for monitoring a deployed system for portions of the application architecture that have already been implemented; and
   wherein the step of visualizing the behavior of the application during the deployment of the application is performed in the mode for monitoring the deployed system.

6. The system of claim 5, further comprising an XML configuration for creating implementations of the event service delivery agent and the controller, wherein the implementations are based on the middleware communicating with the application.

7. The system of claim 6, wherein the controller manages behavior of the application based on at least one of information received from the view component, the model component, and XML configuration information related to the controller.

8. The system of claim 6, wherein the XML configuration comprises:
- abstract information in the form of tiers, components, communication paths and events;
- presentation information in the form of how many display views are required to present the architecture, and how to respond visually when events are received;
- controller information that may specify details that determine how a particular controller implementation behaves; and
- integration information that may be used by a particular implementation of an event service delivery agent.

9. The system of claim 5, wherein the view component creates different views of the application dependent on whether the system is in a conception mode, a development mode, or a deployment mode.

10. The system of claim 5, wherein the view component deploys a slowed down event visualization in a demonstration mode.

11. The system of claim 5, wherein the view component creates a visualization based on configuration information.

12. The system of claim 5, wherein the event service delivery agent forwards events to the model component as a callback instruction.

* * * * *

UNITED STATES PATENT AND TRADEMARK OFFICE
CERTIFICATE OF CORRECTION

| | | |
|---|---|---|
| PATENT NO. | : 6,970,813 B1 | |
| DATED | : November 29, 2005 | |
| INVENTOR(S) | : David I. Houlding et al. | |

It is certified that error appears in the above-identified patent and that said Letters Patent is hereby corrected as shown below:

Column 2,
Lines 36-58, delete:
"FIG. 10 illustrates a Configuration TierView Node which may contain one or more TierView elements;
FIG. 10A describes the valid attributes for the DisplayName element;
FIG. 10B describes the valid attributes for the TierView element;
FIG. 10C describes the valid attributes for the ComponentView element;
FIG. 11 illustrates a Configuration EventView Node which may contain zero or more EventView elements;
FIG. 11A describes the valid attributes for the EventView element;
FIG. 11B describes the valid attributes for the PathView element;
FIG. 11C describes the valid attributes for the ComponentHighlightView element;
FIG. 12 illustrates a Configuration Controller Node which determines the "feel" or behavior of an application;
FIG. 13 illustrates an examplary view of an Application Architecture for Viewing in Simulation Mode;
FIG. 14 illustrates a Normal End to End Scenario for Viewing an Architecture in Simulation Mode;".

Column 3,
Line 16, add:
-- FIG. 10 illustrates a Configuration TierViewNode which may contain one or more TierView elements;
FIG. 10A describes the valid attributes for the DisplayName element;
FIG. 10B describes the valid attributes for the TierView element;
FIG. 10C describes the valid attributes for the ComponentView element;
FIG. 11 illustrates a Configuration EventView Node which may contain zero or more EventView elements;
FIG. 11A describes the valid attributes for the EventView element;
FIG. 11B describes the valid attributes for the PathView element;
FIG. 11C describes the valid attributes for the ComponentHighlightView element;
FIG. 12 illustrates a Configuration Controller Node which determines the "feel" or behavior of an application;
FIG. 13, illustrates an exemplary view of an Application Architecture for Viewing in Simulation Mode;
FIG. 14 illustrates a Normal End to End Scenario for Viewing an Architecture in Simulation Mode; --.

UNITED STATES PATENT AND TRADEMARK OFFICE
CERTIFICATE OF CORRECTION

PATENT NO. : 6,970,813 B1
DATED : November 29, 2005
INVENTOR(S) : David I. Houlding et al.

It is certified that error appears in the above-identified patent and that said Letters Patent is hereby corrected as shown below:

<u>Column 10,</u>
Line 12, replace "PathView 1000B" with -- PathView 1100B --.
Line 13, replace "ComponentHighlightView 1000C" with
-- ComponentHighlightView1100C --.

Signed and Sealed this

Thirteenth Day of June, 2006

JON W. DUDAS
*Director of the United States Patent and Trademark Office*